(12) United States Patent
Mansour et al.

(10) Patent No.: US 10,990,820 B2
(45) Date of Patent: Apr. 27, 2021

(54) HETEROGENEOUS CONVOLUTIONAL NEURAL NETWORK FOR MULTI-PROBLEM SOLVING

(71) Applicant: Dura Operating, LLC, Auburn Hills, MI (US)

(72) Inventors: Iyad Faisal Ghazi Mansour, Auburn Hills, MI (US); Heinz Bodo Seifert, Ortonville, MI (US)

(73) Assignee: DUS OPERATING INC., Auburn Hills, MI (US)

( * ) Notice: Subject to any disclaimer, the term of this patent is extended or adjusted under 35 U.S.C. 154(b) by 47 days.

(21) Appl. No.: 16/293,180

(22) Filed: Mar. 5, 2019

(65) Prior Publication Data

US 2019/0278990 A1 Sep. 12, 2019

Related U.S. Application Data

(60) Provisional application No. 62/639,214, filed on Mar. 6, 2018.

(51) Int. Cl.
*G06K 9/00* (2006.01)
*G06T 7/10* (2017.01)
(Continued)

(52) U.S. Cl.
CPC ......... *G06K 9/00664* (2013.01); *G01S 7/417* (2013.01); *G01S 7/4802* (2013.01); *G01S 7/539* (2013.01); *G01S 13/931* (2013.01); *G01S 15/931* (2013.01); *G01S 17/931* (2020.01); *G06K 9/00* (2013.01); *G06K 9/00805* (2013.01);
(Continued)

(58) Field of Classification Search
CPC ....................... G06K 9/00664; G06K 9/00825
See application file for complete search history.

(56) References Cited

U.S. PATENT DOCUMENTS

2017/0076195 A1\* 3/2017 Yang .................... G06N 3/0454
2019/0114774 A1\* 4/2019 Zhang ..................... G06N 3/04

OTHER PUBLICATIONS

Zhu, Yingying et al., Cascaded Segmentation-Detection Networks for Text-Based Traffic Sign Detection, EEE Transactions on Intelligent Transportation Systems, Jan. 2018, 209-219, vol. 19.

(Continued)

*Primary Examiner* — Tuan H Nguyen
(74) *Attorney, Agent, or Firm* — Vivacqua Crane PLLC

(57) ABSTRACT

A heterogeneous convolutional neural network (HCNN) system includes a visual reception system generating an input image. A feature extraction layer (FEL) portion of convolutional neural networks includes multiple convolution, pooling and activation layers stacked together. The FEL includes multiple stacked layers, a first set of layers learning to represent data in a simple form including horizontal and vertical lines and blobs of colors. Following layers capture more complex shapes such as circles, rectangles, and triangles. Subsequent layers pick up complex feature combinations to form a representation including wheels, faces and grids. The FEL portion outputs data to each of: a first sub-network which performs a first task of object detection, classification, and localization for classes of objects in the input image to create a detected object table; and a second sub-network which performs a second task of defining a pixel level segmentation to create a segmentation data set.

18 Claims, 4 Drawing Sheets

(51) Int. Cl.
  *G06K 9/62*      (2006.01)
  *G06N 3/04*      (2006.01)
  *G06K 9/46*      (2006.01)
  *G06N 3/08*      (2006.01)
  *G01S 7/41*      (2006.01)
  *G01S 15/931*    (2020.01)
  *G01S 7/539*     (2006.01)
  *G01S 13/931*    (2020.01)
  *G01S 7/48*      (2006.01)
  *G01S 17/931*    (2020.01)

(52) U.S. Cl.
  CPC ....... *G06K 9/00825* (2013.01); *G06K 9/4628* (2013.01); *G06K 9/6227* (2013.01); *G06K 9/6267* (2013.01); *G06N 3/0454* (2013.01); *G06N 3/08* (2013.01); *G06T 7/10* (2017.01); *G01S 2013/9323* (2020.01); *G01S 2013/9324* (2020.01); *G01S 2013/93271* (2020.01); *G06K 9/00818* (2013.01)

(56) References Cited

OTHER PUBLICATIONS

Mansour, Iyad et al., A Proposed Heterogeneous Convolutional Neural Network for Embedded Automotive Vision Algorithms. May 2018.

Jiang, Fan et al., Deep Scene Text Detection with Connected Component Proposals, AMAP Vision Lab, Aug. 1-10, 2018.

Zhu, Yixing and Du, Jun, Sliding Line Point Regression for Shape Robust Scene Text Detection, Jan. 30, 2018.

\* cited by examiner

HETEROGENEOUS CONVOLUTIONAL NEURAL NETWORK FOR MULTI-PROBLEM SOLVING

FIELD

The present disclosure relates generally to artificial intelligence convolutional neural networks.

BACKGROUND

The statements in this section merely provide background information related to the present disclosure and may or may not constitute prior art.

Convolutional neural networks (CNNs) are being used to solve problems in computer vision, including image classification, object detection, and object segmentation problems. A CNN may be comprised of one or more convolutional layers, typically including a subsampling step, followed by one or more fully connected layers similar to a standard multilayer neural network. The architecture of a CNN is designed to take advantage of the 2D structure of an input image including pixel images from a camera. This includes local connections and tied weights followed by some form of pooling which produce translation invariant features. The benefits of CNNs include they are easy to train and have fewer parameters than fully connected networks with the same number of hidden units.

Conventional CNNs do not solve two or more independent problems at the same time. For example, known CNNs when applied to automobile vehicle assist and autonomous control systems cannot perform object detection including classification and localization, and road segmentation (lane detection) problems simultaneously. This requires the vehicle computer system to perform multiple parallel or independent computational steps, thereby requiring longer computational time and increased memory.

Thus, while current automobile artificial intelligence system CNNs achieve their intended purpose, there is a need for a new and improved convolutional neural network system allowing multi-problem solving.

SUMMARY

According to several aspects, a heterogeneous convolutional neural network (CNN) system includes a visual reception system generating an input image. A feature extraction mechanism in a convolutional neural network includes feature extraction layers (FEL) of convolutional neural networks having multiple convolution, pooling and activation layers stacked together with each other, directly receiving the input image, conducting a learning operation to learn to represent a first stage of data of the input image. The FEL includes multiple different stacked layers, wherein the first set of layers (the one directly after the input image) learns to represent data in a very simple form such as horizontal and vertical lines and simple blobs of colors. The following layers capture more complex shapes such as circles, rectangles, triangles, and the like. The subsequent layers pick up complex combinations of features from the previous layer or layers to form a more meaningful representation such as wheels, faces, grids, and the like. All of the above occurs inside the FEL, therefore the HCNN saves computation, memory, and speeds up execution by performing the above actions only once for each of the sub-networks. The FEL portion outputs the first stage of data to: a first sub-network which performs a first task of object detection, classification, and localization for classes of objects in the input image to create a detected object table; and a second sub-network which performs a second task of defining a pixel level segmentation to create a segmentation data set. The first stage of data include a first feature map captured from the input image.

In another aspect of the present disclosure, the FEL portion includes a first convolution and pooling layer (CPL) portion receiving the first stage of data and in a second stage of data capturing shapes including circles, rectangles, triangles, and the like. The first CPL portion forwards the second stage of data to the first sub-network for performing the first task of object detection, classification, and localization for classes of objects in the input image to create the detected object table. The FEL is common to each of the sub-networks and is reused while separation into specialized layers occurring after the FEL provides for individual special tasks including pixel level segmentation and object detection, classification, and localization.

In another aspect of the present disclosure, the FEL portion includes a second CPL portion capturing a third stage of data defining complex geometries including combinations of the first stage of data and the second stage of data and complex feature combinations to form a representation including wheels, faces and grids, the second CPL portion forwarding the third stage of data to the first sub-network for performing the first task of object detection, classification, and localization for classes of objects in the input image to create the detected object table.

In another aspect of the present disclosure, the second sub-network is trained by minimizing a loss function of the second sub-network while freezing the first sub-network.

In another aspect of the present disclosure, the first sub-network is trained by minimizing a loss function of the first sub-network while freezing the second sub-network.

In another aspect of the present disclosure, training the second sub-network and the first sub-network in a single stage wherein a model loss total $L_{Total}$ is a weighted sum of individual loss functions $L_1$, $L_2$ of each of the second sub-network and the first sub-network.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
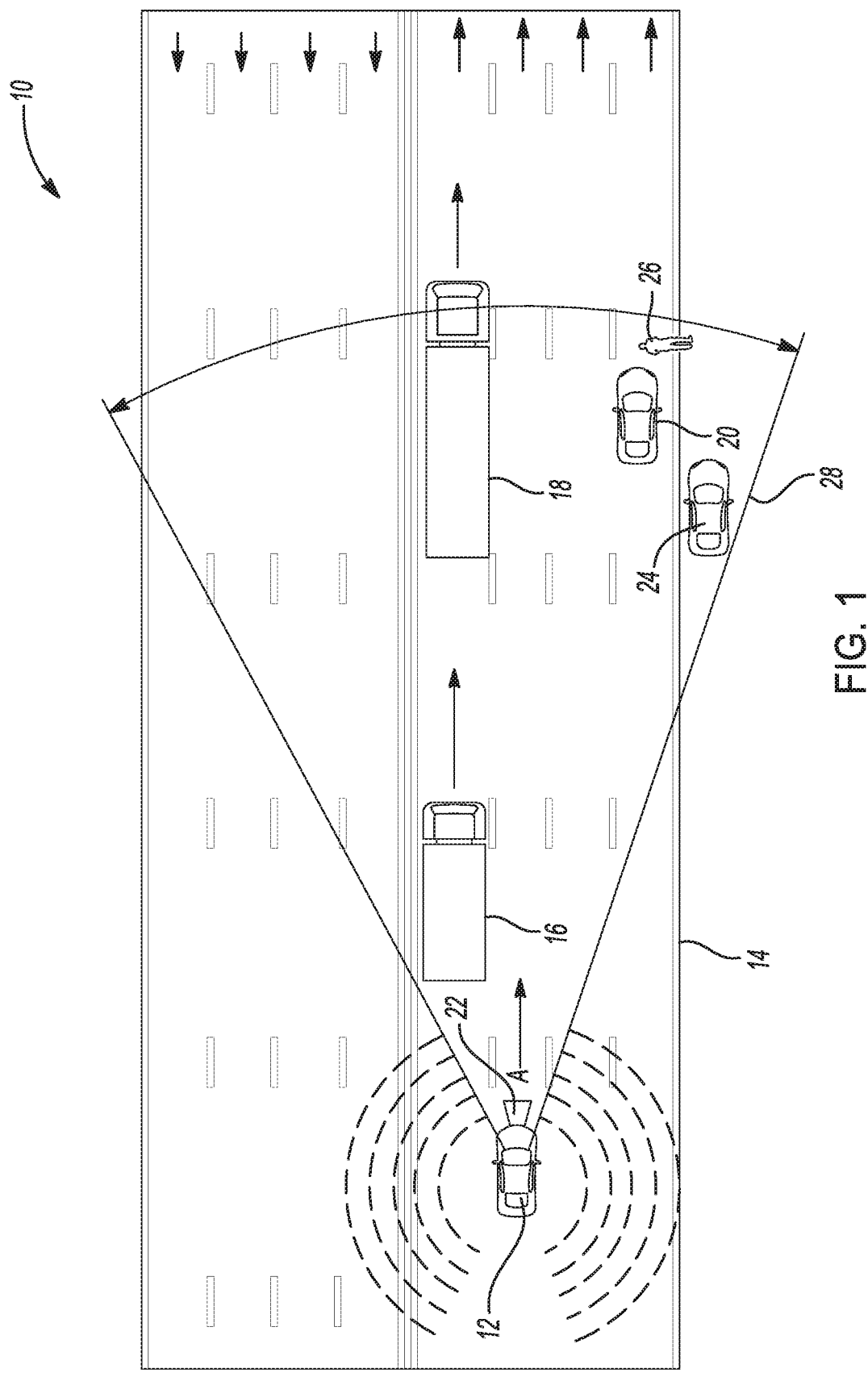
FIG. 1 is a pictorial diagram of a roadway visibility and identification range of a host vehicle having a heterogeneous convolutional neural network (CNN) system of the present disclosure.

Referring to FIG. 1, a heterogeneous convolutional neural network (HCNN) system 10 receives object attribute data in a host vehicle 12 as it travels on a road or highway 14 in a general path of travel "A" in a third lane of the highway 14 together with other vehicles on the highway 14. The other vehicles can include for example a first vehicle 16 such as a truck in an adjacent second lane but in front of the host vehicle 12, a second vehicle 18 which may be partially blocked from direct view to the host vehicle 12 by the first vehicle 16, as well as a third vehicle 20 such as a car travelling in a third lane on the highway 14. Object attribute data may also be received from a fourth vehicle 24 which is stopped or disabled, and may be on the highway 14 or off to a side of the highway 14. The image received by the system may also include a pedestrian 26.

Figure 2:
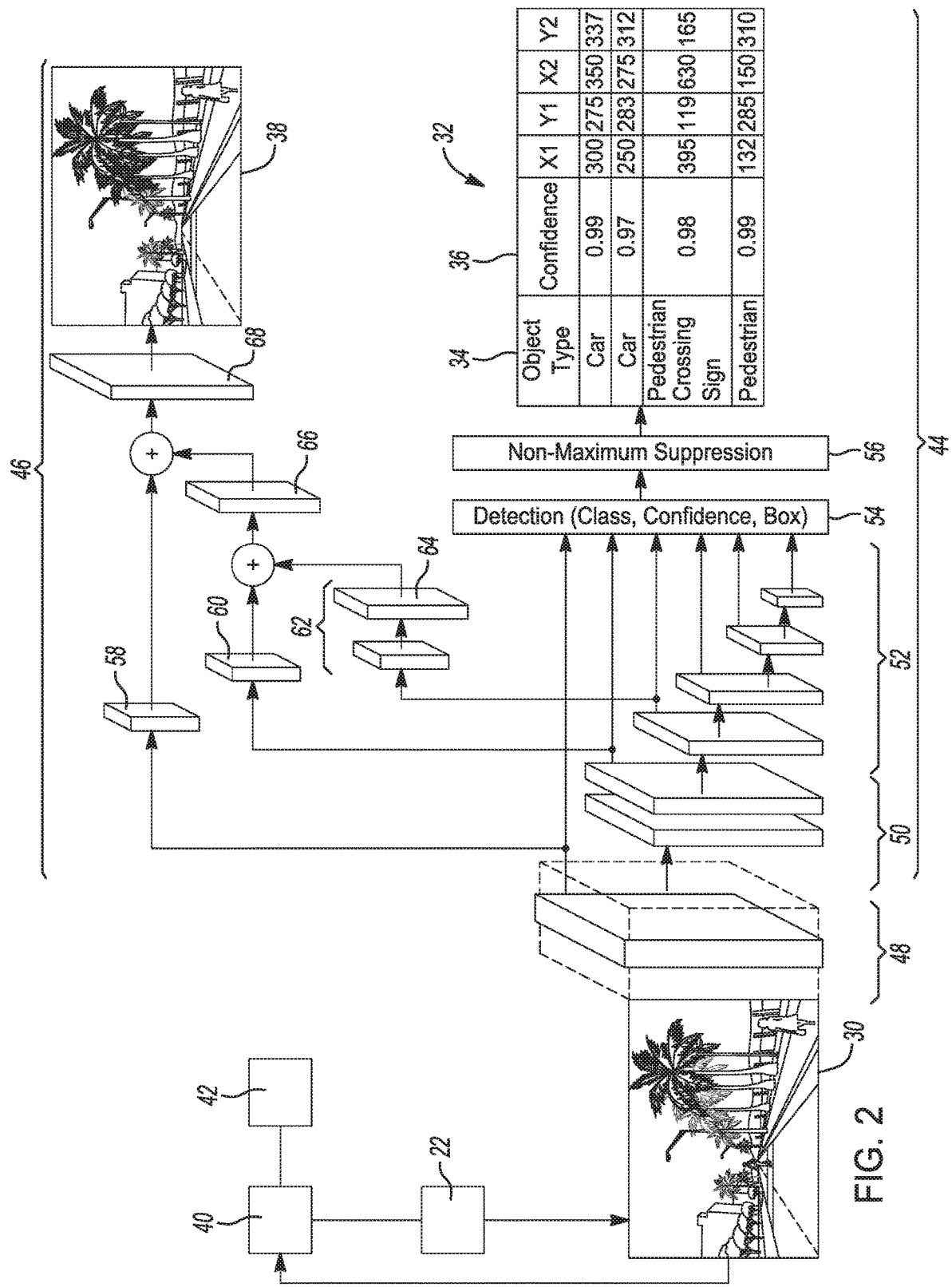
FIG. 2 is a diagrammatic presentation of the elements of the CNN system of the present disclosure.

HCNN system 10 receives image data via a visual reception system 22 such as a camera, a LIDAR, or a RADAR system which collects the object attribute data, for example as a pixel image 30 shown and described in reference to FIG. 2. In this manner the object attribute data may be utilized for Advanced Driver Assist (ADAS) technology by also utilizing sensors that are in an existing centralized vision processor. The visual reception system 22 may further receive information as object imaging data defining the pedestrian 26 in an immediate vicinity of the fourth vehicle 24, and fixed objects such as bridges, guard rails, trees, highway signs, and the like that are all located within a host vehicle predefined sensing and transmission window 28 of the HCNN system 10.

Referring to FIG. 2 and again to FIG. 1, the heterogeneous convolutional neural network (HCNN) system 10 of the present disclosure receives an input image 30 generated by the visual reception system 22. The HCNN system 10 may further receive additional input images over a predetermined period of time, for example once every 30 ms as the host vehicle 12 travels along the highway 14. It is desirable to generate at least two outputs using the data in the input image 30, by solving at least two independent problems. A first output defining a detected object table 32 provides a list of detected objects, including object types 34 such as a car, a truck, a pedestrian, and the like, and a confidence level 36 in the accuracy of defining the object type 34. Production of the detected object table 32 requires solutions of classification and localization of the objects. A second output defining a segmentation data set 38 provides data to the host vehicle 12 related to lane detection, lane conditions, and lane positions relative to the host vehicle 12 within the transmission window 28 of the HCNN system 10.

The HCNN system 10 includes a processor or computer 40 which controls the visual reception system 22 and processes the data in the input image 30. As noted above the HCNN system 10 performs several parallel tasks. A first sub-network 44 performs a first task of object detection, classification, and localization for certain classes of objects (vehicles, pedestrians, traffic signs, traffic lights, and the like, where the output from the first sub-network 44 is the list of detected objects, detected object table 32, which provides a confidence level and location information for the detected objects. A second sub-network 46 performs a second task of lane detection. A pixel level segmentation is the solution and the output for the second sub-network 46 providing a colored image defining the segmentation data set 38 that indicates the drivable roads or lanes in front of the host vehicle 12. Additional third and greater sub-networks (not shown) performing further tasks may also be provided with the HCNN system 10.

The HCNN system 10 includes convolutional neural networks (CNNs) having multiple convolution, pooling and activation layers stacked together with each other. A first set of these layers defines a feature extraction layer (FEL) portion 48 defining the first set of layers directly after and directly receiving the input image 30. The FEL portion 48 may be considered part of one or more sub-networks or separate from the sub-networks. The FEL portion 48 conducts a learning operation and thereby learns to represent a first stage of data of the input image 30. The FEL portion 48 includes multiple different stacked layers, wherein the first set of layers (the one directly after and receiving the input image 30) learns to represent data in a very simple form such as horizontal and vertical lines and simple blobs of colors in a first stage of data. The following layers of the FEL portion 48 capture more complex shapes such as circles, rectangles, triangles, and the like in a second stage of data. The subsequent layers of the FEL portion 48 capture complex combinations of features from the previous layer or layers to form a more meaningful representation such as wheels, faces, grids, and the like in a third stage of data. The FEL portion 48 distributes the first stage of data to each of the first sub-network 44 and the second sub-network 46. The first stage of data includes a first feature map captured from the input image.

In the first sub-network 44, included with the layers defining the FEL portion 48 is a sub-set of convolution, pooling and activation layers stacked on top of each other defining a first convolution and pooling layer (CPL) portion 50 and a second convolution and pooling layer (CPL) portion 52. The first convolution and pooling layer (CPL) portion 50 receives the first stage of data output from the FEL portion 48 and in a second stage of data captures the more complex shapes more complex shapes including circles, rectangles, triangles, and the like. Thus, the second stage of data includes a second feature map different than the first feature map. The third and final grouping of layers defining the second convolution and pooling layer (CPL) portion 52 of the first sub-network 44 then captures a third stage of data defining complex combinations of the features from the FEL portion 48 and the first CPL portion 50 to form a meaningful representation such as wheels, faces, grids, and the like needed to handle the individual special tasks such as object detection, classification, and localization. Thus, the third stage of data includes a third feature map different than the first feature map and the second feature map. Each stage of data is passed to each of the CPL portions 50, 52 in succession. Thus, the first stage of data is passed to the CPL portion 50, and the second stage of data is passed to the CPL portion 52.

Data from each of the FEL portion 48, including the CPL portion 50 and the CPL portion 52 are merged to generate a fully connected layer 54. The fully connected layer 54 determines multiple confidence levels for an object identified by the first stage of data, the second stage of data, and the third stage of data. The multiple confidence levels are communicated to a non-maximum suppression module 56 that reduces the multiple confidence levels to a single confidence level for the object. The non-maximum suppression module 56 is used to generate output image data having predicted objects identified at specific x, y coordinate locations in the field of the original input image 30, from which the detected object table 32 is generated.

The HCNN system 10 combines different sub-networks such as the first sub-network 44 and the second sub-network 46 to perform multiple tasks efficiently, thereby using a smaller memory footprint (memory saving) and operating faster than running the different sub-networks separately. To accomplish this, the single FEL portion 48 and therefore the tasks performed by the single FEL portion 48 are common to all the CNNs of the first sub-network 44 and the second sub-network 46 (and any additional sub-networks) for HCNN system 10 regardless of the final task performed by each individual CNN. Because the initial volume of data analyzed from the input image 30 is greatest, by performing this analysis only once and using the output of the single FEL portion 48 for the input of each of the sub-networks reduces computational time and memory and reduces hardware.

A third CPL portion 58 of the second sub-network 46 also directly receives the first stage of data from the FEL portion 48 in lieu of providing a separate feature extraction layer for the second sub-network 46. A fourth CPL portion 60 of the second sub-network 46 receives the second stage of data from the CPL portion 50, and a fifth CPL portion 62 of the second sub-network 46 having a 2× deconvolution member 64 receives the third stage of data from the CPL portion 52. An output from the deconvolution member 64 and the output from the CPL portion 62 are added and passed through a 2× deconvolution member 66. An output from the deconvolution member 66 and the output from the CPL portion 58 are added and passed through an 8× deconvolution member 68 to generate the segmentation data set 38. The first stage of data, the second stage of data, the third stage of data, and any further stages of data from any further convolution layers in the first subnetwork 44 are communicated to the fully connected layer 54.

As used herein, a convolution layer detects the presence of specific features or patterns in the original data by applying a convolution operation between a filter (the weights of the network) and the input image. The output of the convolution for a given filter is called a feature map. A pooling layer represents the process of reducing the spatial size of the input image. Max Pooling and Average pooling are considered as the two most common subsampling methods. For example, if the resolution of the input to a pooling layer is 640×540, then the resolution of the output is 320×270. Thus, a pooling layer leads to the reduction on the size, width and height, by half every time pooling layer is applied. A deconvolution layer reverses the effect of a convolution layer by transposing the corresponding convolution layer in order to recover the effect of the corresponding convolution layer.

The HCNN system 10 provides a method to combine different networks to perform multiple tasks efficiently in one combined heterogonous network, thus using a smaller memory footprint, saving memory resources. Due to the synergies in the FEL portion 48 the partially combined network performs the tasks faster than running separate networks. The HCNN system 10 is described in one present example for use in a perception kit for an ADAS and autonomous vehicle vision system. The HCNN system 10 performs two tasks simultaneously, which in the example of the ADAS and autonomous vehicle vision system includes lane detection and object detection. The first task in this example is the lane detection task, where a pixel level segmentation is the solution for the problem to determine lanes in the picture or image of the road and the output for this sub-task is a colored image that shows the drivable lanes in front of the host vehicle. The second task is object detection, classification, and localization for certain classes of objects (vehicles, pedestrians, traffic signs, traffic lights, etc.), where the output for this task is a list of detected objects with confidence level and location information.

Referring generally to FIGS. 3, 4, 5, and again to FIGS. 1 and 2, training the HCNN system 10 resolves heterogynous CNN tasks where a loss function for an individual sub-network differs from a loss function of any of the other sub-networks. HCNN system 10 training can therefore be conducted in multiple stages. In each stage a loss function of a specific task of one sub-network is minimized to train the layers that belong to that task while freezing the other sub-network or sub-networks. For example, a loss function ($L_1$) for the road segmentation task of the second sub-network 46 is a binary cross entropy loss, and a loss function ($L_2$) for the object detection task of the first sub-network 44 is a sum of a localization loss (e.g., smooth $L_1$) and a confidence (e.g., a soft-max or multi-class cross entropy loss).

Figure 3:
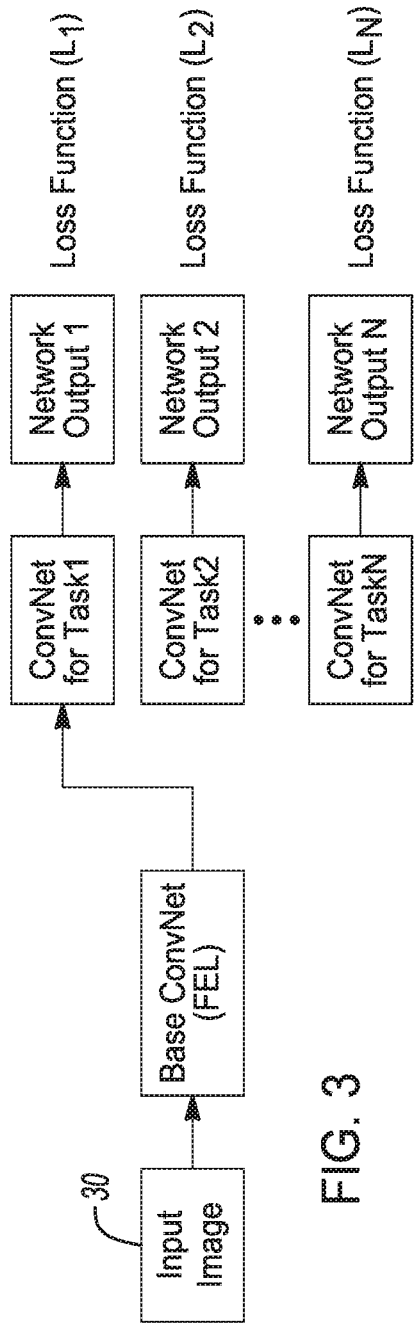
FIG. 3 is a flow diagram describing a first step in a multi-step training process to freeze part of the network and minimize a loss function $L_1$ for training the CNN system of FIG. 2.

With specific reference to FIG. 3, a first step in a multi-step training process to train the HCNN system 10 provides training of the second sub-network 46 by minimizing the loss function $L_1$ while freezing the first sub-network 44, and other sub-networks if present. With specific reference to FIG. 4, a second step in the multi-step training process to train the HCNN system 10 provides training of the first sub-network 44 by minimizing the loss function $L_2$ while freezing the second sub-network 46, and other sub-networks if present. With specific reference to FIG. 5, a third step in the multi-step training process to train the HCNN system 10 provides training of any $N^{th}$ sub-network using a loss function $L_n$ while freezing the first sub-network 44, the second sub-network 46, and other sub-networks if present. These methods ensure that training the layers of one task or sub-network does not affect the layers of the other tasks or sub-networks.

Figure 4:
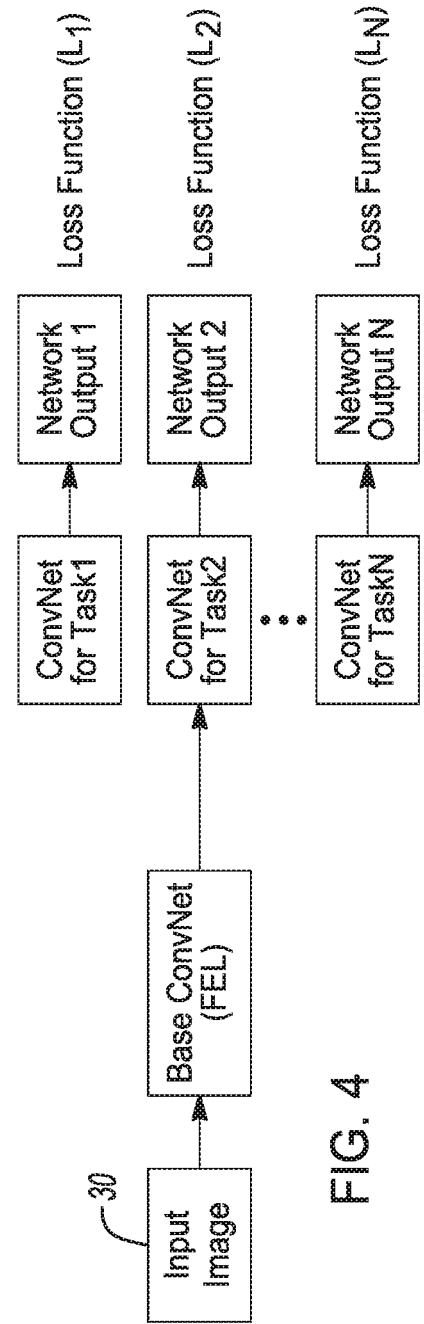
FIG. 4 is a flow diagram describing a second step in a multi-step training process to freeze part of the network and minimize a loss function $L_2$ for training the CNN system of FIG. 2.
Figure 5:
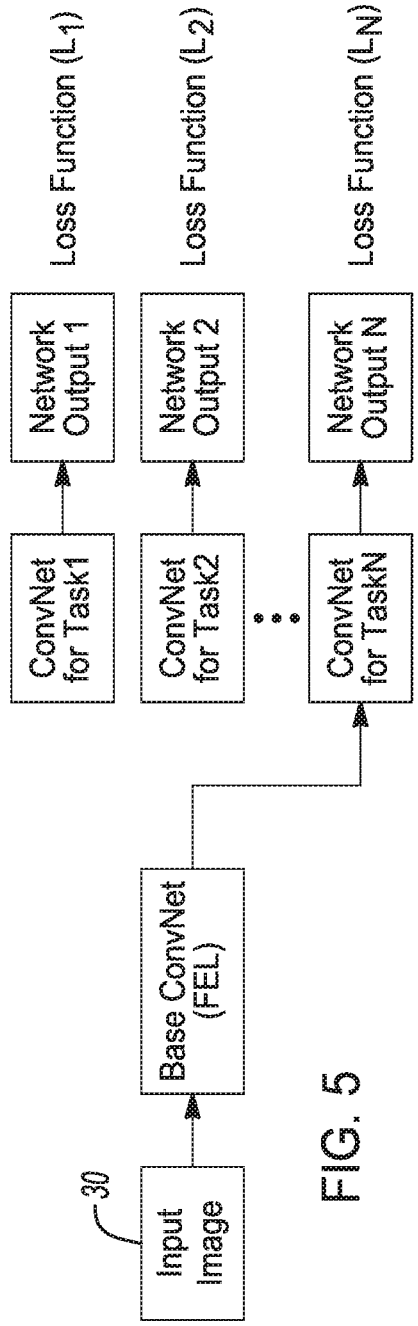
FIG. 5 is a flow diagram describing a third step in a multi-step training process to freeze part of the network for training the CNN system of FIG. 2.
Figure 6:
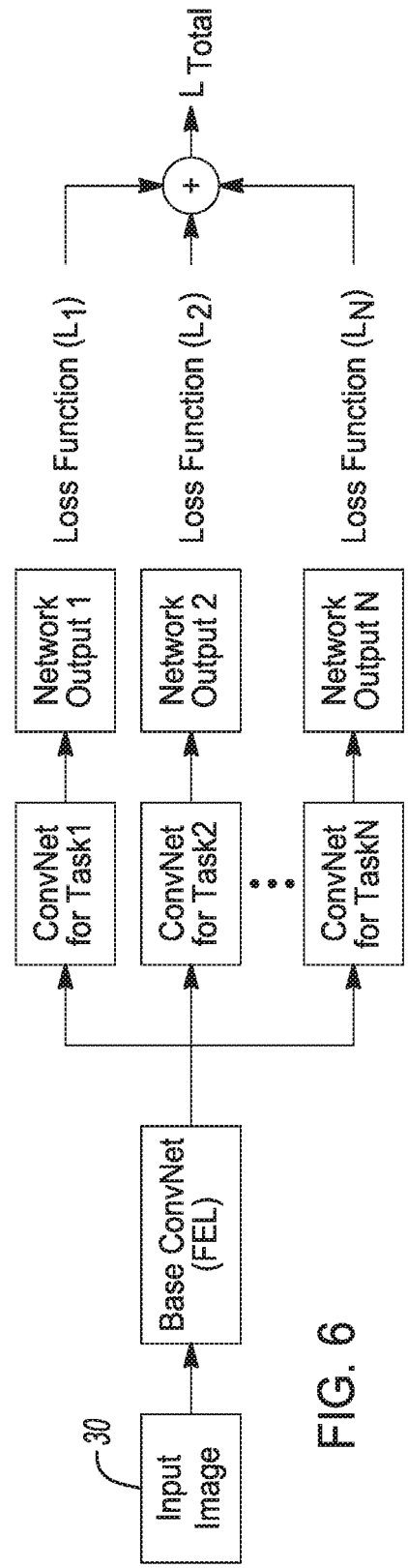
FIG. 6 is a flow diagram delineating steps of a single-stage training method for the CNN system of FIG. 2.

Referring to FIG. 6 and again to FIGS. 3 through 5, a single-stage training method for the HCNN system 10 is provided. In this method, the HCNN system 10 is trained in a single stage for the entire network including the first sub-network 44, the second sub-network 46, and other sub-networks if present. In the single-stage training method, a model loss total $L_{Total}$ is a weighted sum of the individual loss functions $L_1$, $L_2$, $L_n$ as described in reference to FIGS. 3 through 5.

The HCNN system 10 can be trained using multi-stage training or single-stage training. For fine tuning, the HCNN system 10 can also be trained using both the multi-stage training followed by the single-stage training.

A heterogeneous convolutional neural network (HCNN) system 10 of the present disclosure offers several advantages. These include the capability to merge separate machine vision challenges in a single heterogeneous network, thereby reducing overall memory usage and the time needed to run predictions. For automobile vehicle vision systems, this permits object detection including classification and localization and road segmentation including lane detection to be addressed together using output from a single feature extraction layer (FEL) portion of the convolutional neural networks. In addition, each sub-network can be trained using a loss function of that sub-network while freezing the other sub-network or sub-networks.

Additionally, in the claims and specification, certain elements are designated as "first", "second", "third", "fourth", "fifth", "sixth", and "seventh". These are arbitrary designations intended to be consistent only in the section in which they appear, i.e. the specification or the claims or the summary, and are not necessarily consistent between the specification, the claims, and the summary. In that sense they are not intended to limit the elements in any way and a "second" element labeled as such in the claim may or may not refer to a "second" element labeled as such in the specification. Instead, the elements are distinguishable by their disposition, description, connections, and function.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A heterogeneous convolutional neural network (HCNN) system, comprising:
    a feature extraction layer (FEL) portion that receives an input image, the FEL portion conducting a learning operation to learn to represent a first stage of data of the input image and outputting the first stage of data to both of:
    a first sub-network directly receiving the first stage of data from the FEL portion and performing a first task; and
    a second sub-network directly receiving the first stage of data from the FEL portion and performing a second task,
    wherein the first stage of data comprises a first feature map,
    wherein the first sub-network includes a first convolution and pooling layer (CPL) portion receiving the first stage of data and capturing a second stage of data, and
    wherein the second stage of data includes a second feature map different than the first feature map.

2. The HCNN system of claim 1, wherein the second stage of data includes a second feature map different than the first feature map.

3. The HCNN system of claim 2, wherein the first sub-network includes a second convolution and pooling layer (CPL) portion receiving the second stage of data and capturing a third stage of data.

4. The HCNN system of claim 3, wherein the third stage of data includes a third feature map different than the first feature map and the second feature map.

5. The HCNN system of claim 4, wherein the second stage of data and the third stage of data are both input into the second sub-network.

6. The HCNN system of claim 4, wherein the second sub-network includes a third convolution layer and pooling payer (CPL) portion, a fourth convolution layer and pooling payer (CPL) portion, and a fifth convolution layer and pooling payer (CPL) portion.

7. The HCNN system of claim 6, wherein the third CPL portion receives the first stage of data, the fourth CPL portion receives the second stage of data, and the fifth CPL portion receives the third stage of data.

8. The HCNN system of claim 7, wherein outputs from the third CPL portion, the fourth CPL portion, and the fifth CPL portion include pixel level segmentation and are combined into a segmentation data set.

9. The HCNN system of claim 4, wherein the first stage of data, the second stage of data and the third stage of data are input into a fully connected layer that determines multiple confidence levels for an object identified by the first stage of data, the second stage of data, and the third stage of data.

10. The HCNN system of claim 9, wherein the fully connected layer communicates the multiple confidence levels to a non-maximum suppression module that reduces the multiple confidence levels to a single confidence level for the object.

11. The HCNN system of claim 1, wherein the first task includes object detection, classification, confidence, and localization for objects in the input image to create a detected object table.

12. The HCNN system of claim 1, wherein the second task includes defining a pixel level segmentation to create a segmentation data set.

13. A system for a vehicle, the system comprising:
    a visual reception system generating an input image;
    a heterogeneous convolutional neural network (HCNN) system, comprising:
    a feature extraction layer (FEL) portion that receives the input image, the FEL portion generating a first stage of data of the input image and outputting the first stage of data to both of:
    a first sub-network directly receiving the first stage of data from the FEL portion and performing object detection, classification, confidence, and localization for objects in the input image to create a detected object table; and
    a second sub-network directly receiving the first stage of data from the FEL portion and defining a pixel level segmentation to create a segmentation data set, wherein multiple stages of data generated in the first subnetwork is input into the second sub-network,
    wherein the first stage of data comprises a first feature map,
    wherein the first sub-network includes a first convolution and pooling layer (CPL) portion receiving the first stage of data and capturing a second stage of data, and
    wherein the second stage of data includes a second feature map different than the first feature map.

14. The system of claim 13, wherein the multiple stages of data generated in the first sub-network include multiple feature maps.

15. The system of claim 13, wherein a second convolution and pooling layer (CPL) portion receiving the second stage of data and capturing a third stage of data, and the second stage of data and the third stage of data are both input into the second sub-network, wherein the second stage of data includes a second feature map different than the first feature map and the third stage of data includes a third feature map different than the first feature map and the second feature map.

16. The system of claim 15, wherein the second sub-network includes a third convolution layer and pooling payer (CPL) portion, a fourth convolution layer and pooling payer (CPL) portion, and a fifth convolution layer and pooling payer (CPL) portion, wherein the third CPL portion receives the first stage of data, the fourth CPL portion receives the second stage of data, and the fifth CPL portion receives the third stage of data.

17. The system of claim 16, wherein the first stage of data, the second stage of data and the third stage of data are input into a fully connected layer that determines multiple confidence levels for an object identified by the first stage of data, the second stage of data, and the third stage of data, and the fully connected layer communicates the multiple confidence levels to a nonmaximum suppression module that reduces the multiple confidence levels to a single confidence level for the object.

18. The system of claim 16, wherein outputs from the third CPL portion, the fourth CPL portion, and the fifth CPL portion include pixel level segmentation and are combined into the segmentation data set.

* * * * *